July 24, 1956 G. A. LYON 2,756,110
WHEEL COVER
Filed Aug. 13, 1952 3 Sheets-Sheet 1
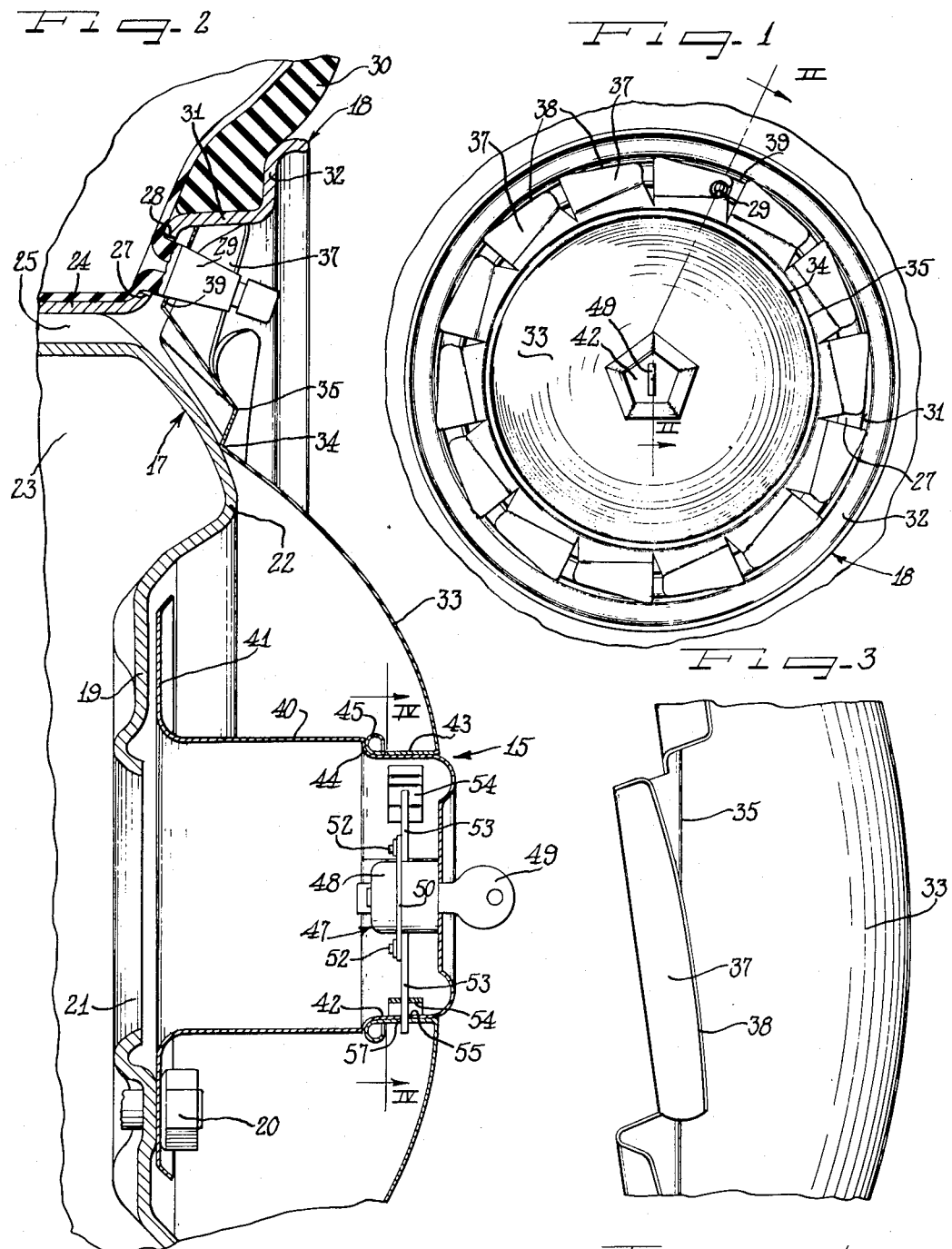
Inventor
George Albert Lyon July 24, 1956
G. A. LYON
2,756,110
WHEEL COVER
Filed Aug. 13, 1952
3 Sheets-Sheet 2
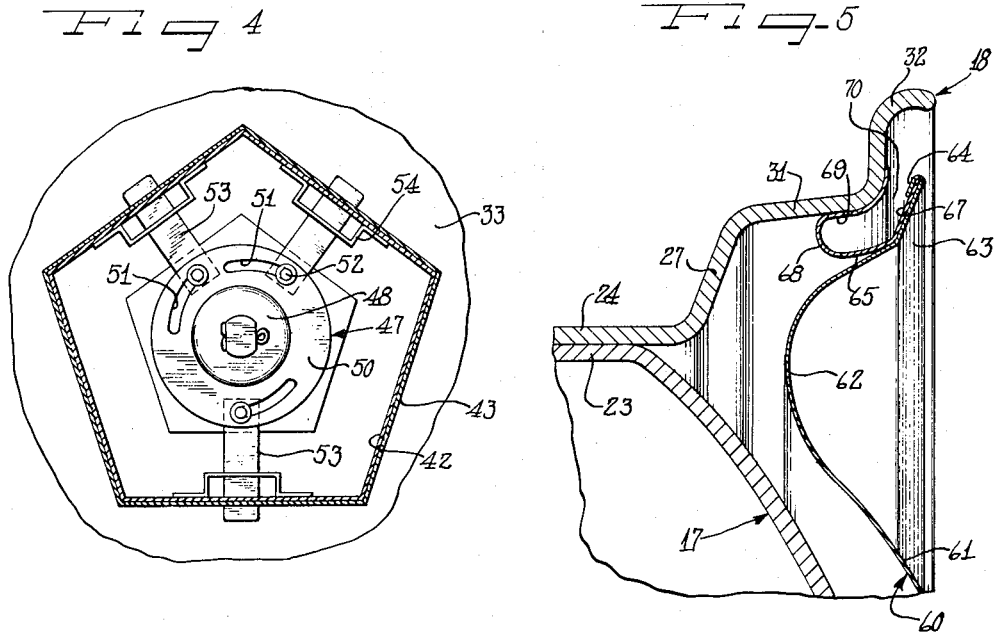
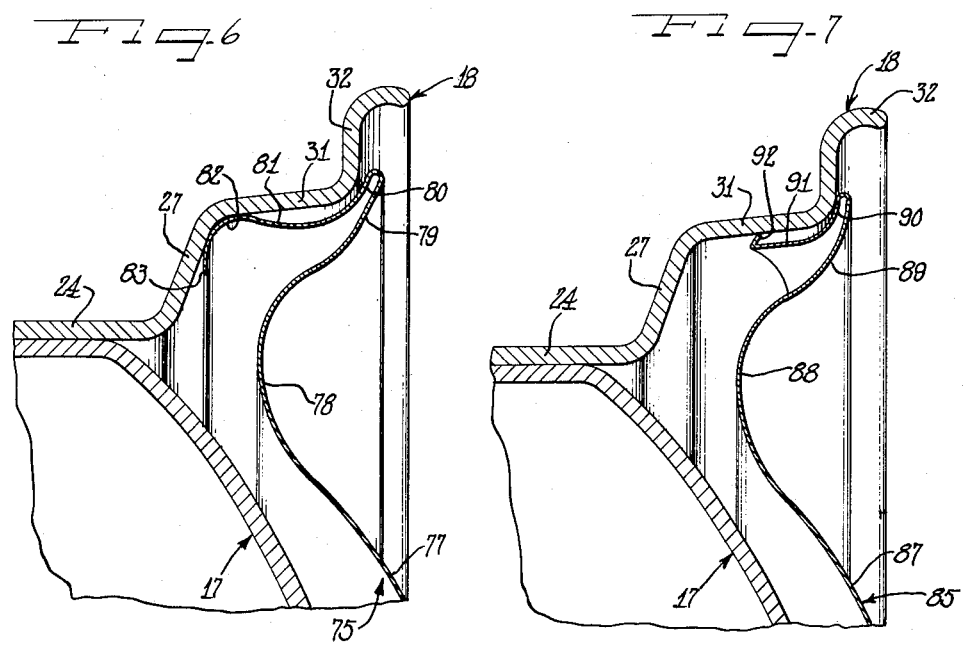
Inventor
George Albert Lyon

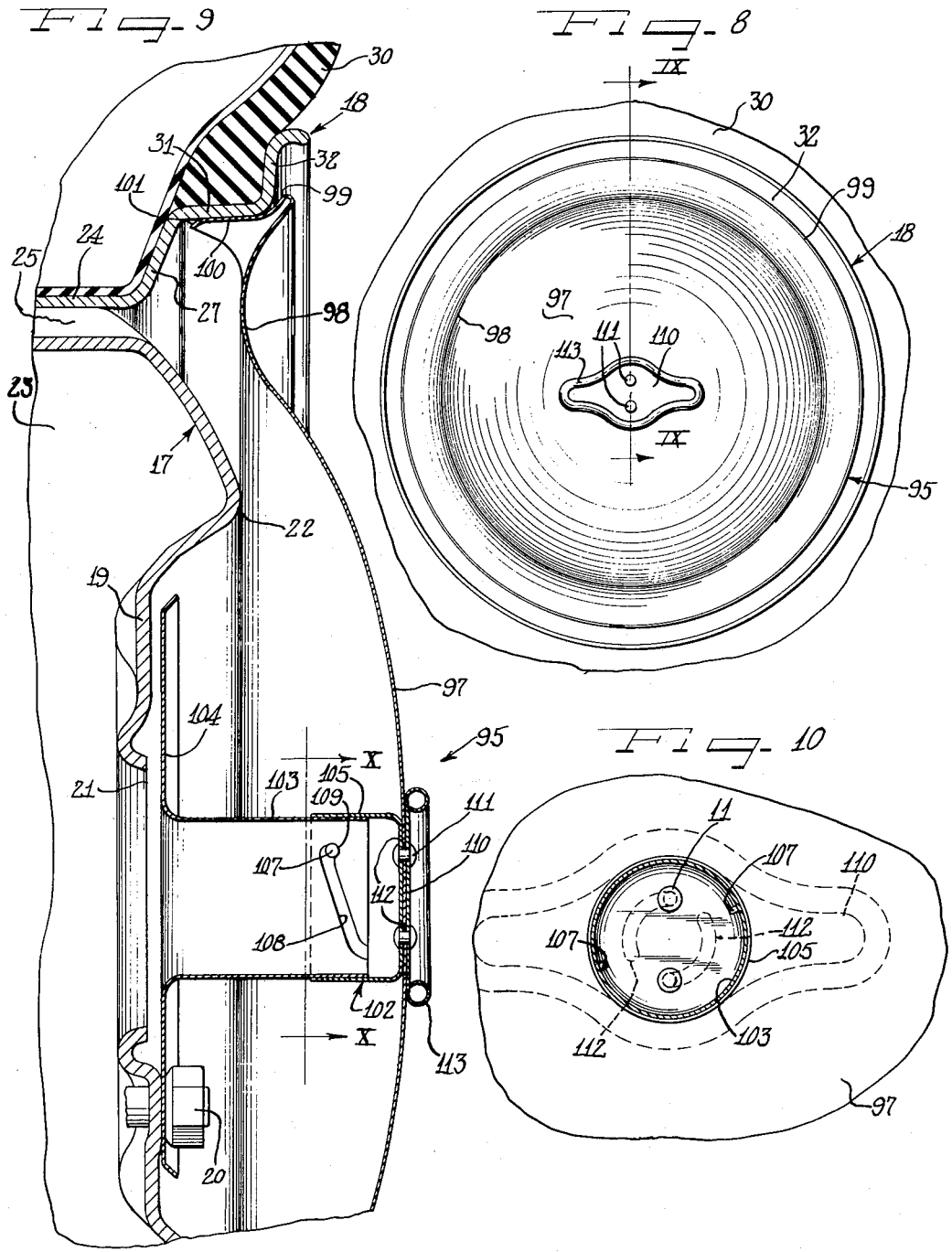

United States Patent Office 2,756,110
Patented July 24, 1956

2,756,110

WHEEL COVER

George Albert Lyon, Detroit, Mich.

Application August 13, 1952, Serial No. 304,098

9 Claims. (Cl. 301—37)

The present invention relates to improvements in wheel structure and more particularly concerns the ornamental and protective covering of automobile wheels.

An important object of the present invention is to provide an improved wheel structure having cover means protected against dropping off or unauthorized removal.

Another object of the invention is to provide improved wheel structure having novel means for preventing unintentional dislodgement of the cover or theft.

A further object of the invention is to provide improved means for not only preventing unauthorized removal of a vehicle wheel but also for preventing unauthorized removal of a cover for the wheel.

It is still another object to provide a novel combination wheel and cover locking device.

Still another object of the invention is to provide a novel wheel cover structure which lends itself to economical manufacture on a large production basis.

Yet another object of the invention is to provide improved means for retaining a wheel cover against turning on the wheel.

According to general features of the present invention, there is provided in a wheel structure including a tire rim and a wheel body having a central bolt-on flange, a cover member having a central attachment portion, a member removably attachable to the bolt-on flange of the wheel, and locking mechanism carried by said last mentioned member for securing said attachment means of the cover member detachably.

According to other features of the invention, the locking means and the attachment means on the cover member have an interengaging structure holding the cover against turning on the wheel.

According to additional general features of the invention, there is provided in a cover assembly for disposition at the outer side of a vehicle wheel, a cover member for disposition at the outer side of a wheel, including a synchro attachment structure, and retaining means comprising a member arranged to be attached to a wheel body and including releasable means for securing said attachment means on the cover member for retaining the cover on the wheel.

Other objects, features and advantages of the present invention will be readily apparent from the following detailed description of certain preferred embodiments thereof, taken in conjunction with the accompanying drawings, in which:

Figure 1 is a side elevational view of a vehicle wheel having on a cover assembly according to the present invention;

Figure 2 is a sectional detail view taken substantially on the line II—II of Figure 1;

Figure 3 is a fragmentary side elevational view of the cover of Figures 1 and 2;

Figure 4 is a fragmentary sectional detail view taken substantially on the line IV—IV of Figure 2;

Figure 5 is a fragmentary radial sectional view through a wheel showing of a modified cover structure;

Figure 6 is a fragmentary radial sectional view similar to Figure 5 but showing a further modification;

Figure 7 is a fragmentary radial sectional view similar to Figures 5 and 6 but showing still another modification;

Figure 8 is a side elevational view of a wheel showing a further modified form of cover;

Figure 9 is a fragmentary diametrical sectional view on an enlarged scale, taken substantially on the line IX—IX of Figure 8; and Figure 10 is a fragmentary detail sectional view taken substantially along the line X—X of Figure 9.

As shown on the drawings:

Having reference to Figures 1 through 4, a wheel cover assembly 15 embodying features of the present invention is adapted to be applied to the outer side of a vehicle wheel comprising a wheel body 17 and a tire rim 18. The wheel body may be of the stamped sheet metal type comprising a disk spider including a bolt-on flange 19 which through the medium of attachment bolts 20 is adapted to be secured in place on a vehicle axle structure (not shown) in well known manner. The bolt-on flange has a central aperture 21 through which a bearing hub of the axle structure is adapted to project.

Radially outwardly of the bolt-on flange, the wheel body 17 has an annular axially outwardly bulging reinforcing nose 22 which, at its radially outer side, slopes in a generally radially outwardly and axially inwardly to a margin generally axially inwardly extending attachment flange 23 by which the wheel body is attached in suitable manner to a base flange 24 of the tire rim 18. At appropriate intervals, the marginal flange is inset to provide air circulation openings 25 between the wheel body and the tire rim.

Extending generally radially outwardly from the base flange 24, the tire rim has an outer side flange 27 provided with an opening 28 through which a valve stem 29 of a pneumatic tire and tube assembly 30 carried by the tire rim is adapted to project. Completing the outer side of the multi-flange drop center structure of the tire rim is an intermediate generally axially outwardly extending flange 31 which merges with a terminal flange 32.

The cover assembly 15 is preferably dimensioned to substantially cover the outer side of the wheel including the wheel body 17 and the tire rim 18. To this end, the cover assembly comprises a generally circular cover member 33 which may be of outwardly bulging crowned shape as shown and provided with an intermediate annular inwardly extending reinforcing rib 34 providing a seating portion engageable against the radially outer side of the nose bulge 22 of the wheel body. Radially outwardly from the rib 34 is an oppositely projecting annular reinforcing rib 35 from which projects an annular series of retaining fingers 37 which are preferably uniformly tilted in one peripheral direction, as best seen in Figures 2 and 3, to provide a series of air circulation vanes and are spaced apart peripherally so as to have a fan effect in the rotation of the cover on the wheel. At their radially outer ends, the retaining finger vanes are provided with retaining edges 38 arranged to grip the inner side of the intermediate flange 31 of the tire rim under tension. One of the retaining finger members 37 is provided with a valve stem opening 39 for projection therethrough of the valve stem 29. The construction and arrangement of the cover member 33 is such that to apply the same to the outer side of the wheel, the cover member is generally centered with respect to the wheel and with the retaining edges 38 of the finger members 37 engaging against the juncture shoulder between the intermediate flange 31 and the terminal flange 32 of the tire rim, by virtue of the fingers normally projecting to a slightly greater diameter than the intermediate flange 31. Then, by pressing the cover member 33 axially inwardly, the retaining edges 38 are caused to cam not only axially inwardly but radially inwardly along the sloping inner surface of the intermediate flange 31, thus placing the retaining fingers 37 under the radially and axially inward tension. Thereby the retaining edges 38 attain a substantial retaining grip against the intermediate flange 31, axially inward movement of a cover member 33 being limited by engagement of the rib 34 with the wheel body.

Removal of the cover member 33 can be effective readily by insertion of a pry-off tool behind the successive ones of the retaining fingers 37 to pry the same free from the tire rim.

For retaining the cover member 33 in tensioned relation to the wheel and also to maintain the cover against unintentional or unauthorized axial displacement or removal, a central hub-like member 40 is provided which, as shown, preferably comprises a tubular sheet metal member of a size to encircle the central opening 21 in the bolt-on flange 19. A lateral generally radially outwardly extending base or foot flange 41 is provided on the member 40 to engage against the bolt-on flange 19 for attachment to the bolt-on flange by means of the bolts 20.

At its outer end, the member 40 is provided with a head portion 42 which is preferably non-circular in peripheral outline and may, as shown in Figures 1 and 4, be in pentagonal shape, but may obviously be of other non-circular form, for engagement with a central portion of the cover member 33 in non-rotary relation. To this end, the cover member 33 is at its central portion provided with a generally axially inwardly extending flange 43 complementary to the peripheral outline of the head portion 42 so as to engage the same in axially telescopically slidable assembly and for thereby holding the cover against relative rotation on the wheel. By preference, the head portion 42 is provided at its base with a generally axially outwardly facing shoulder 44 and the flange 43 is provided with a reinforcing and finishing generally radially outwardly curled bead 45 which may in the full assembly bottom against the shoulder 44.

For latching or locking the cover 33 against displacement or removal the member 40 carries in the head portion 42 thereof latching or locking mechanism 47 of suitable character. For example, this locking mechanism may be of the type shown in the patent to Frederick A. Smith, No. 2,217,775. Such mechanism comprises a central key-operated locking device 48, operable by means of a removable key 49. A rotatable disk 50 carried by the mechanism 48 has spiral cam slots 51 in which respectively ride pins 52 associated with radially slidably supported latch bars 53 so that as the lock mechanism 48 is turned the latch bars 53 will be radially projected or retracted, depending on which direction the disk 50 is turned through the medium of the key 49.

Respective brackets 54 support the bars 53 for reciprocal movement for protraction through or retraction from registering latch apertures 55 and 57 in respectively the side walls of the head 42 and the flange 43. Thereby the cover 33 is locked against accidental displacement or unauthorized removal from the wheel when the latch bars 53 extend through the respective apertures 57 in the flange 43. The cover can be removed when the latch bars 53 are withdrawn from the apertures 57.

By preference, the construction and arrangement is such that the cover member 33 is placed under resilient tension as an incident to locking the same in place. To this end, the cover member 33 normally tends to remain somewhat axially outwardly at the center relative to the latch head 42 after the outer marginal retaining elements 37 have been moved fully into assembly with the tire rim. In this relationship, the aperture 57 is not in registration with the aperture 55. Then, by pushing further axially inwardly against the central portion of the cover member 33, the cover crown is tensioned, by resistance of the bottomed shoulder rib 34 against further axially inward movement. When the apertures 55 and 57 have been brought into registration so that the latch bars 53 can project therethrough to lock the cover in place, the cover is held under tension so as to avoid any rattling or looseness in service.

It will thus be apparent that to gain access to the wheel bolts 20, the cover 33 must be removed and this can only be accomplished by means of the key 49 to open the lock 47 and thus release the cover 33 for pry-off from the wheel. As a result, not only is unauthorized removal of the cover 33 prevented, but also unauthorized removal of the wheel is prevented by having the cover 33 locked in place as described.

The modifications of Figures 5, 6 and 7 reside in different forms of outer marginal attachment of the cover to the wheel. Inasmuch as the wheel structure itself remains unchanged, identical reference numerals have been used in Figures 5, 6 and 7 to designate the identical parts.

In the form of Figure 5, a cover 60 is provided comprising a central crown portion 61, an intermediate inset, dished annular portion 62 and a marginal portion 63, which, in the present instance, extends preferably generally frusto conically generally radially and axially outwardly, and is provided with and underturned reinforcing and finishing flange 64.

For preliminary retention of the cover on the wheel, it is provided marginally with retaining fingers or clips 65 which may comprise individual elements or may comprise extensions from a continuous ring member 67 which is generally complementary to the marginal portion 63 of the cover and is secured therebehind by having the outer margin thereof clamped in place by the underturned flange 64. Each of the clips 65 comprises a generally axially inwardly extending resilient loop 68 having a generally axially outwardly and radially outwardly extending seating and frictional engagement flange or shoulder portion 69 which is preferably generally complementary to the juncture shoulder between the intermediate flange 31 and the terminal flange 32 of the tire rim. The construction and arrangement of the clips 68 are such that when the cover 60 is pressed home on the wheel, the seating shoulder portions 69 of the clips will engage frictionally under tension against the intermediate flange 31 while the terminal portions of the seating flanges 69 of the clips bear against the adjacent portion of the terminal flange 32 to serve as stops against further axially inward movement of the cover and thereby hold the margin of the cover in spaced, floating relation to the tire rim. This leaves a space 70 between the tire rim and the margin of the cover for air circulation, and also enables floating movement of the margin of the cover relative to the tire rim.

In the modification of Figure 6, a cover member 75 comprises a crown portion 77 merging with an annular indented, generally dished intermediate portion 78 from which slopes generally axially and radially outwardly a marginal portion 79 having an underturned reinforcing and finishing flange 80 from which extends a retaining flange portion 81. By preference, the retaining flange portion 81 is continuous or substantially continuous peripherally and is of inwardly bowed shape so as to clear the juncture between the intermediate flange 31 and the terminal flange 32 of the tire rim. At its axially inner end, the flange 81 has a rib-like resilient gripping and stop terminal portion 82 bulging generally radially outwardly and having a generally radially inwardly directed terminal flange 83. In applying the cover 75 to the wheel, the gripping and stop shoulder 82 which normally extends to a slightly greater diameter than the inner portion of the intermediate flange 31, cams inwardly along the intermediate flange 31 and is tensioned to frictionally grip the inner portion of the intermediate flange. In the fully assembled relation of the cover 75 on the wheel, the terminal structure 82 bears against the side flange 27 of the tire rim and holds the outer marginal portion of the cover in spaced relation to the tire rim so that the outer marginal portion has a range of relative floating movement relative to the tire rim.

The modification of Figure 7 discloses a cover 85 having a crown portion 87 merging with an intermediate dished annular portion 88 from which extends a generally axially outwardly and preferably convexly cross-sectioned marginal portion 89. An underturned reinforcing and finishing flange 90 at the extremity of the marginal portion 89 has extending therefrom generally axially inwardly directed retaining finger flanges 91 which are provided with short and stiff generally axially and radially outwardly angled retaining terminals 92 having edges for retainingly gripping the inner side of the intermediate flange of the tire rim.

The retaining fingers 91 are resiliently deflectable under tension radially inwardly as an incident to applying the cover to the wheel. Since the retaining terminals 92 normally extend to a greater diameter than the inside diameter of the intermeditae flange of the tire rim, it will be appreciated that as the cover is pushed axially inwardly, the retaining terminals 92 cam axially and radially inwardly and place the retaining fingers 91 under tension which improves the gripping action of the retaining terminals 92 against the tire rim and the intermediate flange. Axially inward limit upon movement of the cover margin is effected by engagement of the underturned flange 90 against the tire rim.

In each of the modifications of Figures 5, 6 and 7, the cover 60 is held out of engagement with the wheel body 17 and in each instance a stop upon axially inward movement of the cover is effected by the marginal retaining structure of the cover, for attaining the tensioning of the cover body as an incident to locking the cover in place at the center of the wheel substantially in the manner described in connection with the form of Figure 2. Thus, in these modifications, it will be understood that the central portion of the cover assembly will be the same or similar to the disclosure in Figure 2.

In the modified form of Figures 8, 9 and 10, an arrangement similar to that shown in Figure 2 is disclosed but the cover has different outer marginal retaining means and also a somewhat different latching structure is disclosed. In this modified form, a cover assembly 95 is applied to a wheel which is in all essential respects the same as the wheel disclosed in connection with Figure 2 and, therefore, the same reference numerals have been applied to the components of the wheel and the description as applied in Figure 2 should be understood to apply thereto.

The cover assembly 95 comprises a one-piece, full-disk cover member 97 of centrally crowned form, with an annular dished portion adjacent to the margin thereof, and with the margin projecting generally axially and radially outwardly. The diametrical extent of the cover member 97 is such as to cover the wheel body 17 and substantially the tire rim 18.

At its outer extremity the cover member 97 is provided with an underturned reinforcing and finishing flange 99, from which project a suitable series of generally axially inwardly directed retaining finger or flange elements 100 which, in assembly with the tire rim, are adapted to engage in frictional facewise relation against the inner side of the intermediate flange 31 of the tire rim. The retaining flange elements 100 may be formed from corners of a blank from which the cover 97 is made. At their inner ends, the retaining flange finger elements 100 are formed with inwardly turned cam terminals 101 so that when the cover is initially applied to the wheel the terminals 101 will engage cammingly against the outer portion of the intermediate flange 31 and then as the cover is moved inwardly the fingers 100 will be placed under radially inward resilient tension.

Means for maintaining the cover member 97 under tensioned retained engagement on the wheel comprises a central latching mechanism 102 by which the cover is detachably fastened to the bolt-on flange 19 of the wheel. To this end, the latching mechanism 102 comprises a central hub-like tubular member 103 provided with a lateral base or foot flange 104 provided with appropriate bolt openings registering with bolt openings in the bolt-on flange 19 to receive the attachment bolts 20, whereby the member 103 is attached to the wheel.

At its outer end portion, the hollow hub member 103 extends substantially short of the inside of the crowned cover member 97 and is adapted to be telescopically engaged by a relatively rotatable generally cup-shaped latching member 105 carried by the inner side of the cover member 97.

Projecting inwardly from the inner portion of the latching member 105 is a pair of diametrically opposite latch pintles or pins 107 which engage in assembly within respective latching cam slots 108 provided in complementary relation in the outer end portion of the wall of the tubular member 103. It will be observed that the slots 108, only one of which is shown in Figure 9 but which are identical at opposite sides of the member 103, open at the outer edge of the member 103 and slope generally spirally inwardly and terminate in respective retention recesses or notches 109 generally interlockingly receptive of the respective pins 107.

Rotary attachment of the latching member 105 to the cover 97 is effected by means of a handle plate member 110 lying at the center of the outer side of the cover member 97 and attached to the base wall of the member 105 by means such as rivets 111 extending through appropriate arcuate clearance slots 112 provided in the intervening portion of the cover 97. The handle member 110 is preferably elongated in form and has an outwardly curled manipulating rim 113 which is digitally engageable for turning the handle and thereby, through the connection afforded by the rivets 111, turning the latching member 105.

Before the cover member 97 is applied to the wheel, the hub and connecting member 103 is attached concentrically to the wheel by the attachment bolts 20. The cover member 97 is then applied by pressing the retaining fingers 100 slidably into tensioned engagement with the tire rim flange 31, and telescopically registering the latching ferrule or thimble 105 with the outer end of the latching post or hub 103. By turning the handle 110 until the pins 107 enter the mouths of the cam slots 108, registration of the pins 107 is effected within the cam slots and then further turning of the handle effects a drawing in of one of the cover members 97 until the pins 107 bottom at the inner ends of the slots 108 and snap into the latching notches 109 under the outward tension exerted by the cover. As a result, the cover 97 is effectively held on the wheel against unintentional displacement. Since the latching mechanism holds the cover under tension on the wheel, rattling of the cover is prevented.

By having the outer margin 99 of the cover spaced from the tire rim, circulation of air through the wheel openings 25 and past the cover is facilitated.

Removal of the cover member is easily effected by turning the handle 110 to release the pins 107 and then applying a pry-off tool behind the outer margin 99 of the cover to release the fingers 100 from the tire rim.

It will be understood that modifications and variations may be effected without departing from the scope of the novel concepts of the present invention.

I claim as my invention:

1. In a cover assembly for disposition at the outer side of a vehicle wheel, a circular cover having thereon an inner structure providing a flange, a central attachment member for securing the cover to a wheel comprising a portion telescopically interengageable with said flange, and releasable securing means including radially movable arms on said member interengageable with said flange for securing the same to said member.

2. In a cover assembly for disposition at the outer side of a vehicle wheel, a circular cover having thereon an inner structure providing a flange, a central attachment member for securing the cover to a wheel comprising a portion telescopically interengagable with said flange, and releasable securing means interengageable on said flange and said member, said securing means comprising retaining shoulder structure on said flange and key operated latch arm means on said member selectively engageable and disengageable with respect to said shoulder means.

3. In a cover assembly for disposition at the outer side of a vehicle wheel, a circular cover having thereon an inner structure providing a flange, a central attachment member for securing the cover to a wheel comprising a portion telescopically interengageable with said flange, and releasable securing means interengageable on said flange and said member, said securing means comprising engaging lug structure on said flange and interengaging shoulder means on said member relatively engageable and releasable by turning of said flange.

4. In a wheel structure including a wheel body having a central bolt-on flange, a cover assembly including a central member removably attachable to the bolt-on flange, a head portion on said member extending a substantial distance from the bolt-on flange, a cover member having a generally axially inwardly extending flange telescopically interengaging with said head portion, and a radially extending member carried by and extending through said head portion and in engagement with said flange for connecting the cover member to said central member.

5. In a cover assembly, a central member attachable to a wheel, said central member having a head portion carrying a lock member provided with radially projecting bolt means retractible and protractible through a radially opening aperture in said head portion, and a cover member having a central axially inwardly directed flange telescopically engaging said head portion and having an aperture registerable with the aperture in said head portion for locking engagement through said flange of said bolt member.

6. In a cover assembly for disposition at the outer side of a vehicle wheel, a central member for attachment to the wheel, a cover member, said cover member having a central generally cup-shaped member at the inner side of the cover, said cup-shaped member being interengageable with said central member, means interlockingly securing said cup-shaped member and said central member, a handle at the outer side of said cover, and means securing said handle to said cup-shaped member for turning of said cup-shaped member relative to the cover by means of the handle.

7. In a wheel structure including a wheel body and a multi-flange tire rim supported thereby, a cover for disposition at the outer side of the wheel having a central portion for overlying the wheel body and a marginal portion provided with cover engaging resilient extensions engageable against a flange of the tire rim as an incident to axially inward placement of the cover on the wheel, and means on the wheel for maintaining the central portion of the cover under axially inward deflectional pressure for thereby placing said extensions under compressional resilient thrusting engagement with said rim flange, said means including interlocking structure that holds the cover against turning relative to the wheel.

8. In a wheel structure including a cover body having a central axially outwardly extending cover retaining member provided with a head structure of polygonal peripheral outline providing a plurality of radially facing generally axially extending faces, and a cover for disposition at the outer side of the wheel having a central opening defined by an axially inwardly directed flange of polygonal outline complementary to the polygonal outline of said head and providing portions which slidably oppose said head faces in assembly, said head having an outer axially outwardly facing wall carrying a locking member provided at the inner side of said wall with a plurality of protractable and retractable bolts arranged to extend through matching apertures in certain of said faces and the corresponding portions of said flange for locking the cover to said member.

9. In a wheel structure wherein a wheel body carries a tire rim, a cover attaching adapter member of generally tubular shape having means for attaching the same to the wheel body and extending axially outwardly therefrom, said tubular body having a head portion provided with a shoulder at the outer side thereof spaced axially inwardly from its outer end and facing generally axially outwardly, a cover for disposition at the outer side of the wheel having a central axially inwardly direct flange for engagement about said head and provided with an inner margin engageable against said shoulder to delimit the axially inward disposition of the cover, said flange having an opening therein, and cover retaining means operable from within said head portion and engageable with said flange in said opening.

References Cited in the file of this patent

UNITED STATES PATENTS

| | | |
|---|---|---|
| 2,130,207 | Van Halteren | Sept. 13, 1938 |
| 2,159,881 | Booth | May 23, 1939 |
| 2,193,104 | Lyon | Mar. 12, 1940 |
| 2,291,597 | Goeske | Aug. 4, 1942 |
| 2,328,301 | Shaw | Aug. 31, 1943 |
| 2,329,945 | Schatzman | Sept. 21, 1943 |
| 2,443,760 | Arrison | June 22, 1948 |
| 2,535,126 | Flowers et al. | Dec. 26, 1950 |
| 2,574,491 | Lyon | Nov. 13, 1951 |

FOREIGN PATENTS

| | | |
|---|---|---|
| 415,681 | Great Britain | Aug. 30, 1934 |
| 526,576 | Great Britain | Sept. 20, 1940 |
| 630,176 | Great Britain | Oct. 6, 1949 |
| 809,661 | France | Mar. 8, 1937 |